United States Patent
Oki et al.

(10) Patent No.: US 7,621,679 B2
(45) Date of Patent: Nov. 24, 2009

(54) OPTICAL TRANSCEIVER WITH AN OPTICAL SUB-ASSEMBLY SUPPORTER BY A HOLDER AND A COVER

(75) Inventors: Kazushige Oki, Kanagawa (JP); Hiromi Kurashima, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/178,260

(22) Filed: Jul. 23, 2008

(65) Prior Publication Data

US 2009/0034915 A1 Feb. 5, 2009

(30) Foreign Application Priority Data

Jul. 31, 2007 (JP) .............................. 2007-199092

(51) Int. Cl.
*G02B 6/26* (2006.01)
*G02B 6/43* (2006.01)

(52) U.S. Cl. .......................................... 385/92; 385/89
(58) Field of Classification Search ....................... None
See application file for complete search history.

(56) References Cited

U.S. PATENT DOCUMENTS

| | | | |
|---|---|---|---|
| 5,026,748 A | 6/1991 | Adams et al. | |
| 6,475,962 B1 | 11/2002 | Khatri | |
| 6,522,486 B2 | 2/2003 | Furuhashi et al. | |
| 6,762,938 B2 | 7/2004 | Tayebati et al. | |
| 6,841,867 B2 | 1/2005 | Matayabas, Jr. et al. | |
| 7,073,960 B2 | 7/2006 | Anderl et al. | |
| 7,153,043 B1 | 12/2006 | Zhang et al. | |
| 7,213,980 B2 | 5/2007 | Oki et al. | |
| 7,242,824 B2 * | 7/2007 | Scheibenreif et al. | 385/14 |
| 7,260,285 B2 | 8/2007 | Mitamura et al. | |
| 7,280,724 B2 | 10/2007 | Yoshikawa | |
| 7,314,318 B2 | 1/2008 | Anderl et al. | |
| 7,357,582 B2 | 4/2008 | Oki et al. | |
| 2004/0081410 A1 | 4/2004 | Aronson et al. | |
| 2005/0180754 A1* | 8/2005 | Mizue et al. | 398/135 |
| 2005/0265650 A1 | 12/2005 | Priyadarshi et al. | |
| 2005/0286839 A1* | 12/2005 | Yoshikawa | 385/92 |
| 2006/0093287 A1 | 5/2006 | Yoshikawa et al. | |

(Continued)

OTHER PUBLICATIONS

Kazushige Oki et al., U.S. Appl. No. 12/076,099, "Optical Transceiver With Mechanism to Dissipate Heat Efficiently Without Affecting Optical Coupling Condition", filed Mar. 13, 2008.

*Primary Examiner*—Omar Rojas
(74) *Attorney, Agent, or Firm*—Venable LLP; Michael A. Sartori; Steven J. Schwarz

(57) ABSTRACT

An optical transceiver is disclosed, in which an optical sub-assembly may be assembled within a housing without degrading an optical coupling efficiency between a semiconductor optical device in the subassembly and an optical fiber in an external optical connected that is mated with the housing of the transceiver. The subassembly comprises a sleeve portion and a body portion that installs the optical device therein. The subassembly is assembled in the housing such that the sleeve portion thereof is put between the holder and the cover. The holder and the cover each provides a concave surface that comes in contact with the sleeve portion only by two lines in parallel to the optical axis of the subassembly when the sleeve portion is set within the concave surface.

10 Claims, 10 Drawing Sheets

U.S. PATENT DOCUMENTS

2006/0203862 A1 9/2006 Bonen et al.
2007/0133930 A1 6/2007 Ishikawa
2008/0095541 A1 4/2008 Dallesasse

* cited by examiner

FIG. 6A
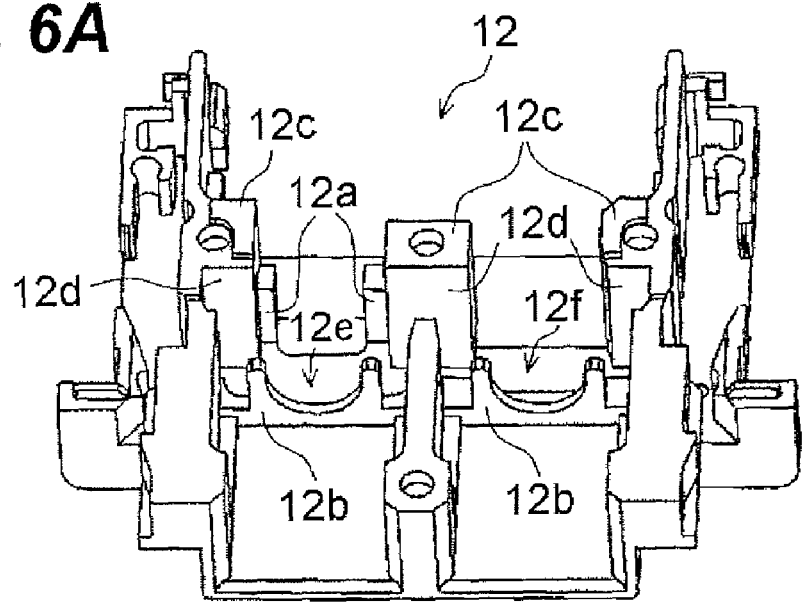
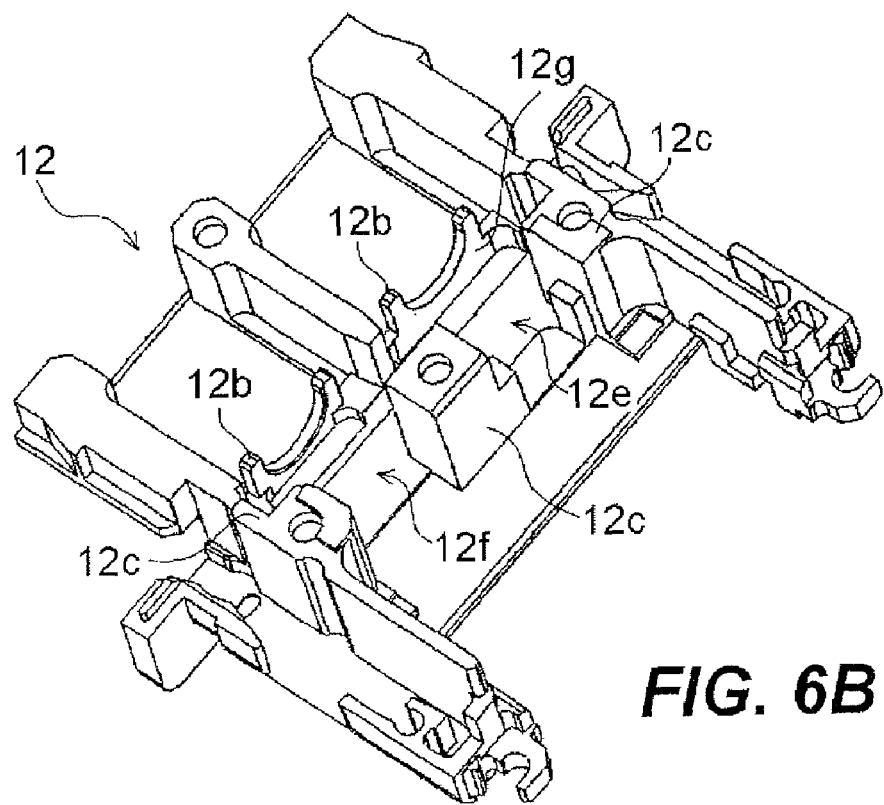
FIG. 6B

OPTICAL TRANSCEIVER WITH AN OPTICAL SUB-ASSEMBLY SUPPORTER BY A HOLDER AND A COVER

CROSS REFERENCE TO RELATED APPLICATIONS

The present is closely related to a prior application, Ser. No. 12/076,099, filed on Mar. 13, 2008, entitled "Optical transceiver with mechanism to dissipate heat efficiently without affecting optical coupling condition," which is incorporated herein by reference in its entirety.

BACKGROUND OF THE INVENTION

1. Field of the Invention

The present invention relates to a pluggable optical transceiver.

2. Related Prior Art

A conventional optical transceiver, such as shown in the U.S. Patent Application published as US 2006/0093287A, mates with an LC-type optical connector and provides an optical sub-assembly with a pair of flanges in the outer surface of the sleeve portion and a housing comprising an upper and lower frames both forming an U-shaped saddle inside of the housing. The subassembly may be assembled with the housing by an arrangement where the U-shaped saddle in both frames sets a portion between the flanges thereon.

Other prior arts of the U.S. Pat. No. 7,357,582 and U.S. Pat. No. 7,213,980, have disclosed another pluggable transceiver that mates with a SC-type optical connector. The optical assembly with a flange in the front side thereof installed in the transceiver is set in the housing by securing the sleeve portion thereof with the housing and the holder that latches the optical connector.

In these optical transceivers, the subassembly has a coaxial shaped body and a cylindrical sleeve portion extending from the body. The sleeve portion provides the paired flange in the former prior art or the single flange in the latter art, and the flange is set within the housing so as to align the optical axis of the subassembly, that is, the optical axis of the sleeve with the optical connector inserted into the optical receptacle of the housing.

Recently, a functional optical transceiver has been known, where an operational speed exceeds 10 GHz and a preciseness and a fluctuation of the emission wavelength are severely controlled. In such an optical transceiver, a light emitting device, typically, a semiconductor laser diode is precisely controlled in its temperature. Inevitably, the optical assembly is necessary to install a temperature controlling device, such as a Peltier device, and a size of the package of the subassembly is enlarged to house the Peltier device. One solution for the subject above mentioned is to use a sub-assembly that provides a box-shaped body installing the optical device and the Peltier device and a sleeve extending from one side of the box-shaped body.

However, when such an optical subassembly with the box-shaped body and the sleeve portion is assembled and aligned within the housing, misalignment of the subassembly easily occurs due to an avoidable moment inevitably induced by the enlarged body. So, the present invention is to provide an optical transceiver that enables to assemble a subassembly with the housing without degrading the optical coupling efficiency between the optical device and the optical fiber.

SUMMARY OF THE INVENTION

An optical transceiver according to the present invention comprises an optical subassembly, a holder, a subassembly cover, an upper frame and a lower frame. The optical subassembly includes a body portion that installs a semiconductor optical device and a sleeve portion that extends from the body portion. The upper and lower frames form an optical receptacle that mates with the external optical connector and support the sleeve portion of the subassembly through the holder and the subassembly cover. A feature of the optical transceiver of the present invention is that the holder and the subassembly cover each provides a concave surface that comes in contact with the sleeve portion of the optical subassembly by two lines in order to align the sleeve portion with the optical receptacle.

Because the sleeve portion of the subassembly is secured by two concave surfaces of the holder and the subassembly cover along the optical axis, the subassembly is securely aligned with the optical receptacle formed by the lower and upper frames even the body portion of the subassembly has a box-shaped package.

The optical subassembly of the present invention is, in addition to the support by the holder and the subassembly cover, fixed to the lower frame such that the flange of the subassembly abuts against the saddle formed in the lower frame is pressed by the holder inserted into a gap between the flange and the post of the lower frame, and is pressed by the subassembly cover inserted into another gap between the flange and the step formed in the post.

The support by the holder and the subassembly cover for the subassembly may align the subassembly in a plane perpendicular to the optical axis of the subassembly, while, the pressing the flange by the holder and the subassembly cover against the saddle of the lower frame may align the subassembly along the optical axis of the subassembly. Thus, the subassembly is not only securely supported by the holder and the subassembly cover but also automatically aligned with respect to the optical axis.

BRIEF DESCRIPTION OF DRAWINGS

FIGS. 6A and 6B are perspective drawings of the lower frame viewed from the front and the rear, respectively;

DESCRIPTION OF PREFERRED EMBODIMENTS

Figure 1A:
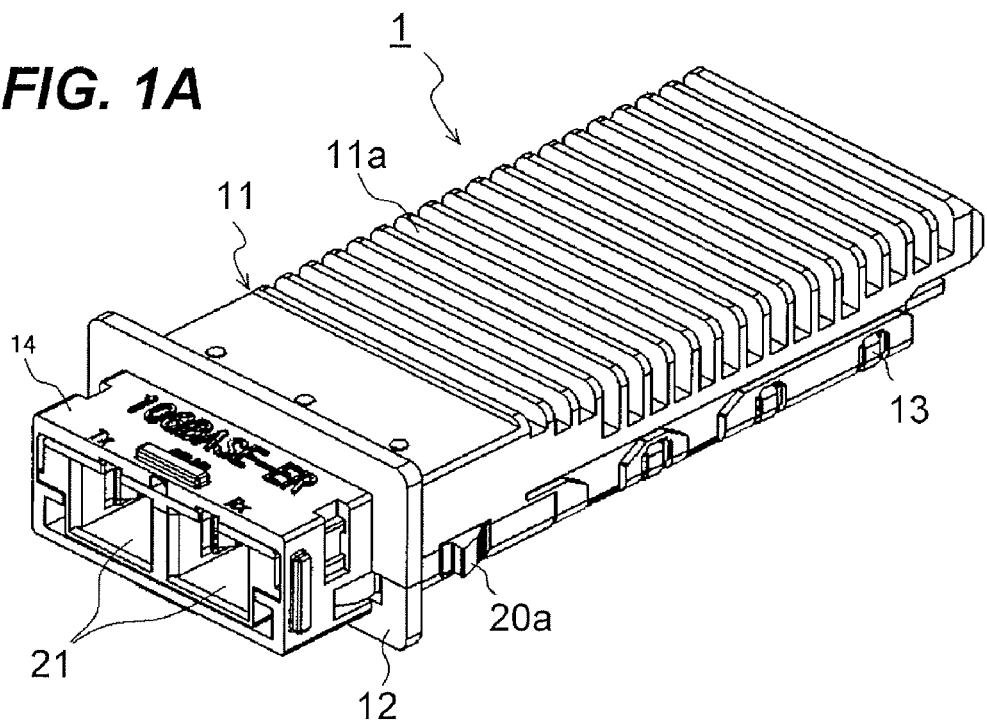
FIG. 1A is a perspective view of the optical transceiver following the X2 specification according to the present invention.
Figure 1B:
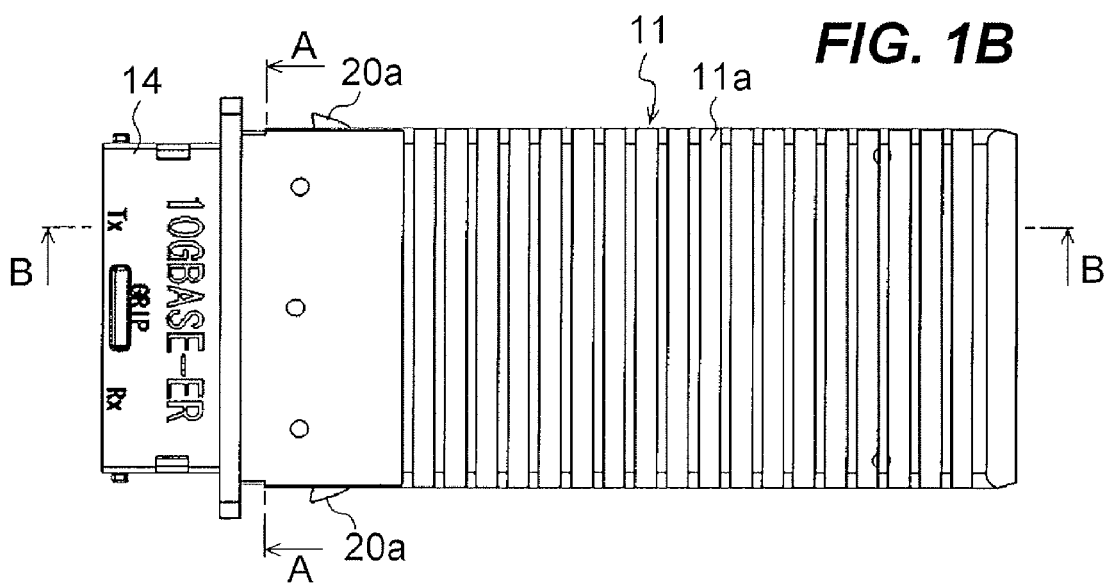
FIG. 1B is a plan view and FIG. 1C is a side views of the optical transceiver.
Figure 1C:
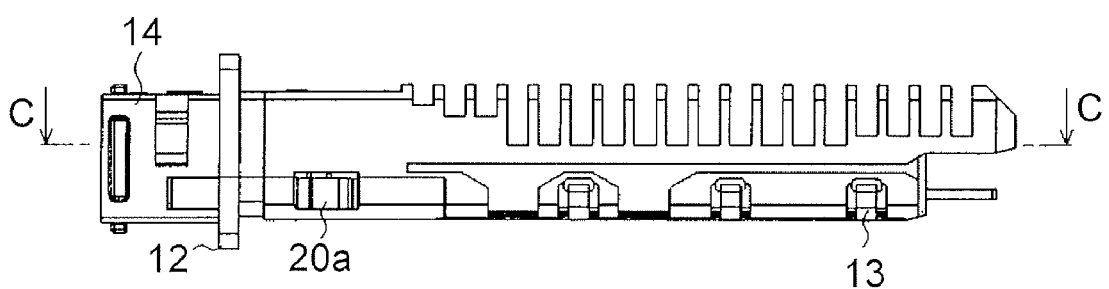
Figure 2A:
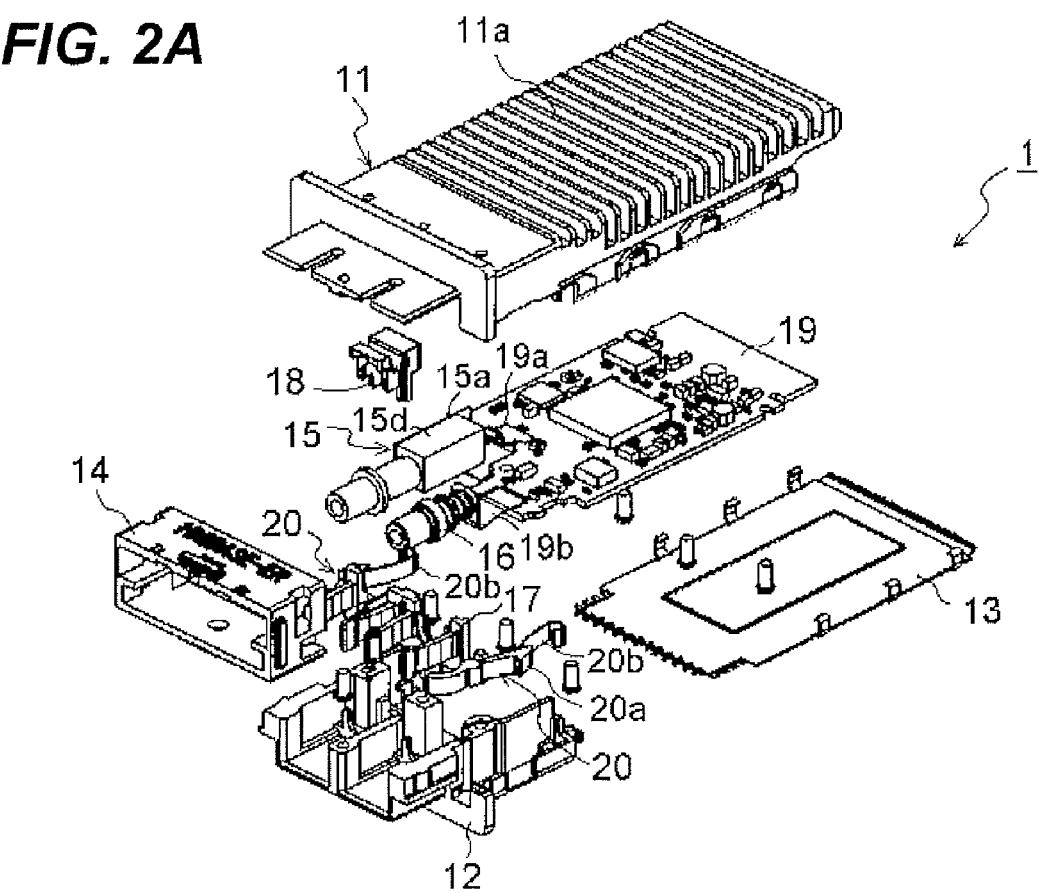
FIG. 2A is an exploded view of the optical transceiver.

FIG. 1A is a perspective drawing of one example of an optical transceiver according to the present invention, FIG. 1B is a top view, while, FIG. 1C is a side view of the transceiver. FIG. 2A is an exploded view and FIG. 2B removes an upper frame 11 to expose the inside of the transceiver.

The transceiver 1 provides upper and lower frames, 11 and 12, and a cover 13. These frames constitute a housing whose specifications follow the XENPAK and X2 standard specified in IEEE 802.3a. The upper and lower frames, 11 and 12, form an optical receptacle 21 into which an external optical connector that secures an optical fiber is to be inserted. In the explanation below, the front of the transceiver 1 corresponds to a side where the optical receptacle 21 is provided, while, the rear is an opposite side.

The side of the housing each exposes a latch tab 20a. When the transceiver 1 is set on a pair of rails provided in the circuit board of the host system, the latch tab 20a mates with the opening formed in the side of the rail, which the transceiver 1 is to be engaged with the host system such that a portion in front of the flange 12 exposes from the host system.

In the front of the latch tab 20a is formed with a grip 14. Sliding the grip 14 in frontward and rearward around the receptacle 21, the latch tab 20a is protruded or pulled into the housing to engage the transceiver 1 with the rail or to release the transceiver 1 from the rail. In the top of the upper frame 11 is provided with a plurality of fins 11a. The transceiver 1 may radiate heat generated within the housing, for instance, heat from a transmitter optical subassembly, primarily from these fins 11a.

Figure 2B:
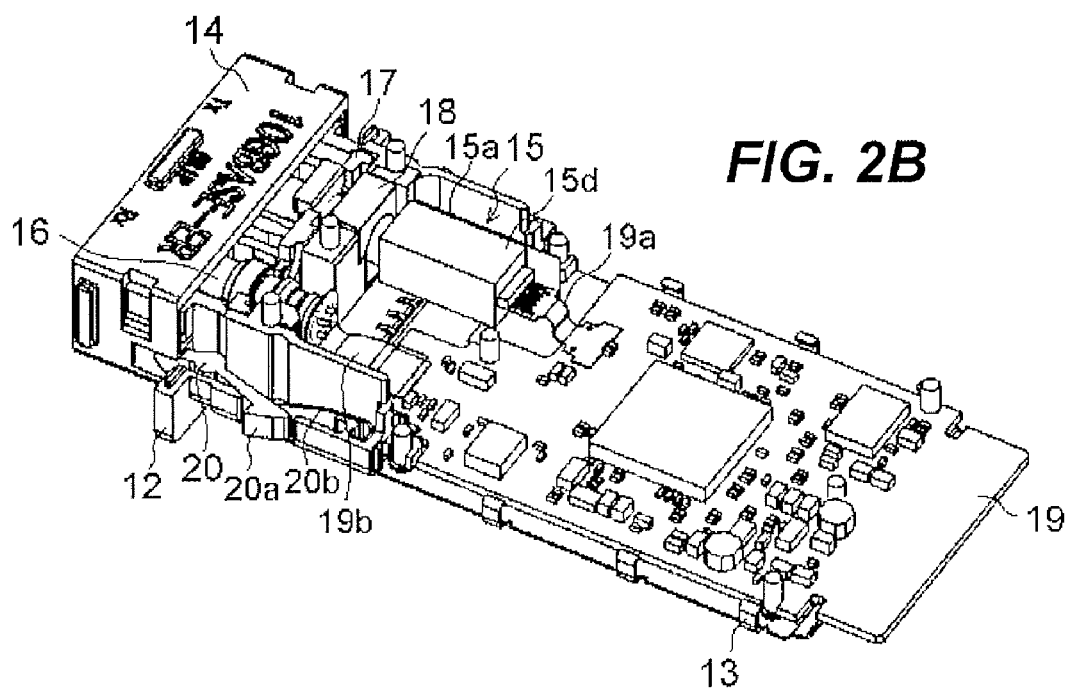
FIG. 2B shows an inside of the optical transceiver which is an appearance after the assembly of the subassemblies and the circuit board are completed.

The transceiver 1 installs, as illustrated in FIGS. 2A and 2B, a transmitter optical sub-assembly (hereafter denoted as TOSA) 15, a receiver optical sub-assembly (hereafter denoted as ROSA) 16, a holder 17, a TOSA cover 18, a circuit board 19 and a latch mechanism 20.

The TOSA 15 provides a box-shaped body 15a, where a light-emitting device such as a semiconductor laser diode (hereafter denoted as LD) and a Peltier device are installed. The ceiling 15d of the body 15a is set within a hollow formed in the inside of the upper frame 11, which is not shown in the figure, via a gelled thermal sheet to conduct heat. This arrangement enhances the heat conduction from the body 15a of the TOSA 15 to the upper frame 11. Thermal grease is applicable instead of the gelled thermal sheet. The ROSA installs an optical device to receive light, typically a photodiode (hereafter denoted as PD). However, a moderate thermal condition is necessary for the ROSA compared with the TOSA, because the light-receiving device shows a less temperature dependence.

The holder 17 supports the TOSA 15 and the ROSA 16 and is attached to the lower frame 12. The TOSA 15 and the ROSA 16 is set on the lower frame 12 through the holder 17. As described later, the holder 17 provides a holding portion with a concave surface coming in contact with a sleeve portion of the TOSA 15 by two lines in parallel to the optical axis of the TOSA. The TOSA 15 is supported by the holder 17 in the sleeve portion thereof from the lower side.

The TOSA cover 18 supports the TOSA 15 from the upper side and is attached to the lower frame 12 so as to cover a center portion of the TOSA 15. The TOSA cover 18 also provides a holding portion with a concave surface coming in contact with the sleeve portion of the TOSA 15 by two lines. The TOSA cover 18 accompanied with the holder 17 put the sleeve portion of the TOSA 15 therebetween such that respective concave surfaces of the TOSA cover 18 and the holder 17 come in contact with the sleeve portion at respective two lines, total four (4) lines. Thus, the TOSA 15 is supported within the housing between the upper and lower frames, 11 and 12, through the holder 17 and the TOSA cover 18, which determines the position of the TOSA 15 in a plane perpendicular to the optical axis thereof.

The circuit board 19 mounts an electronic circuit thereon. The electronic circuit may be electrically connected with the TOSA 15 and the ROSA 15 with a flexible printed circuit (FPC) boards, 19a and 19b, respectively, each extending from the front end of the circuit board 19.

The latch mechanism 20 includes the latch tab 20a that, as already described, extrudes from the side of the housing to engage with the rail of the host system, and a leaf spring 20b that pushes the latch tab 20a outward. The leaf spring 20b sets the neutral position of the latch tab 20a in the most protruded state, which is a state that the latch tab 20a engages with the rail, by pushing the latch tab 20a outward.

Figure 3A:
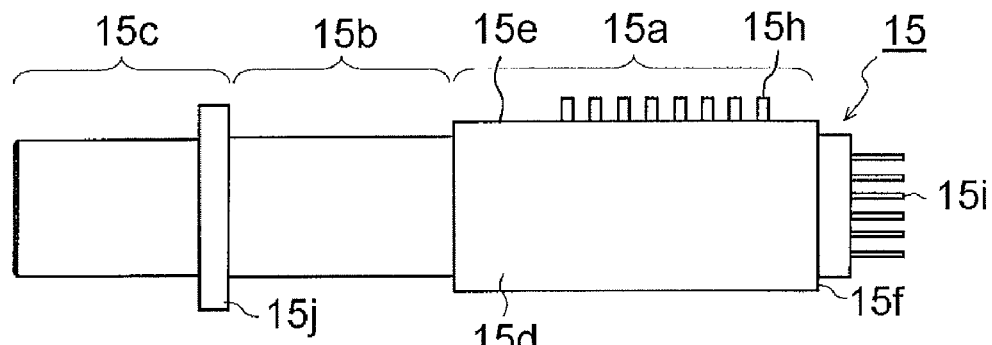
FIGS. 3A and 3B are the plan and the side views of the optical sub-assembly.
Figure 3B:
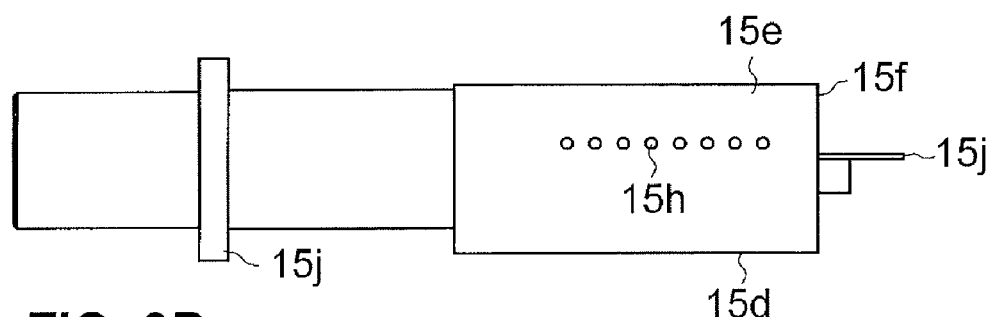
Figure 3C:
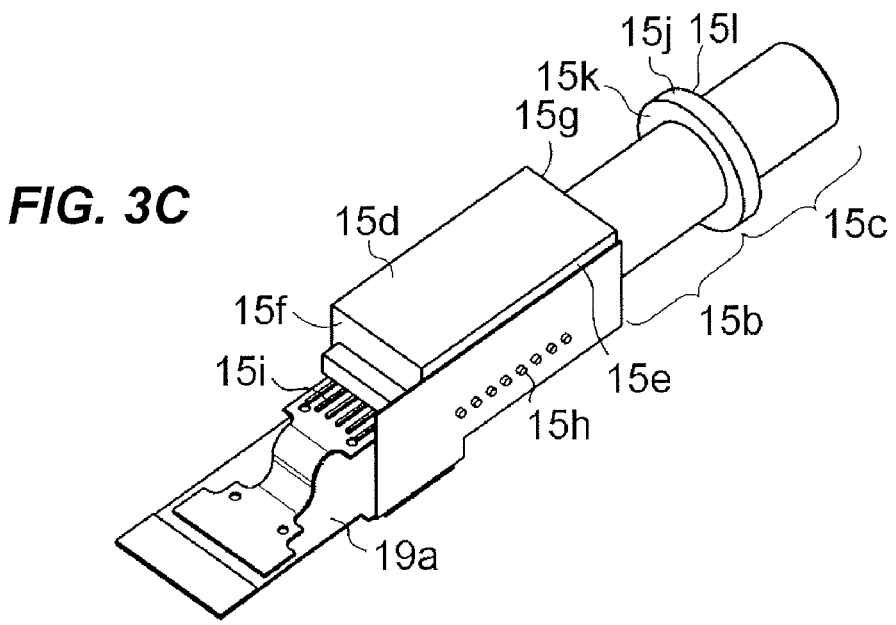
FIG. 3C is a perspective view of the optical transceiver.

Next, a combined structure of the TOSA 15, the holder 17 and the TOSA cover 18 will be described in detail. FIG. 3A is a top view of the TOSA 15, FIG. 3B is a side view, while, FIG. 3C is a perspective view of the TOSA 15 with the FPC board 19a.

The TOSA 15 includes, as already described, the box-shaped body 15a and the sleeve portion. This sleeve portion shapes in cylindrical and comprises a sleeve 15c that receives a ferrule secured within the optical connector inserted into the optical receptacle 21 and an extending cylinder 15b that connects the sleeve 15c with the body 15a.

The Peltier device in the body 15a is mounted on the inner wall of the ceiling 15d made of metal. That is, one of plate of the Peltier device is attached to the inside of the ceiling 15d, while, the other plate mounts the LD thereon. When the plate mounting the LD is cooled down to stabilize the operation of the LD, the other plate of the Peltier device is raised its temperature to balance the thermal condition of the Peltier device. The heat thus generated by the Peltier device may be dissipated through the ceiling 15d of the body 15a. Thus, the ceiling 15d of the TOSA 15 operates as a heat dissipating member.

The lead pins, 15h and 15i, extrude from the sides 15e and rear 15f of the body 15a, respectively. These lead pins, 15h and 15i, are connected with the electronic circuit on the circuit board 19 through the FPC board 19a, as illustrated in FIG. 2B. The extending cylinder 15b extrudes from the front 15g of the body 15.

The sleeve 15c provides a flange 15j with a front and rear surfaces, 15l and 15k, in the rear end thereof. The extending cylinder 15b may provide a concentrating lens to enhance the optical coupling efficiency between the LD in the body portion 15a and the optical fiber inserted in the sleeve 15c. The extending cylinder 15b may further provide a stub to position the tip of the optical fiber inserted into the sleeve 15c.

Figure 4A:
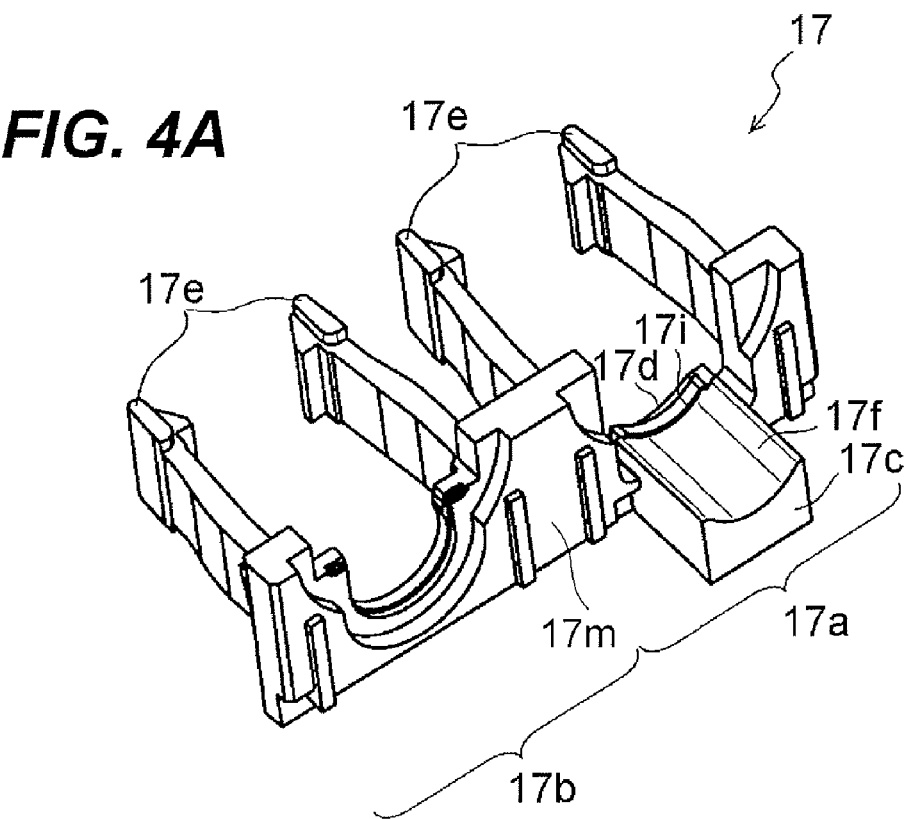
FIGS. 4A and 4B are perspective drawings of the holder viewed from the upper rear and the lower rear, respectively.
Figure 4B:
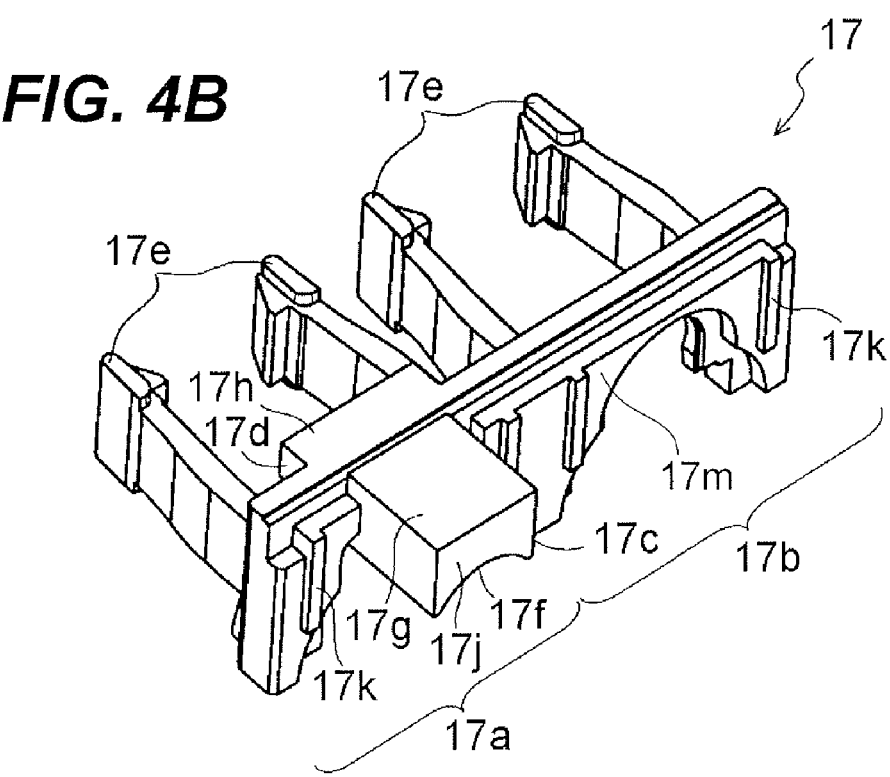

FIG. 4A is a perspective drawing of the holder 17 viewed from the upper, while, FIG. 4B is that viewed from the lower. The holder 17 may be made of resin, where the TOSA side 17a and the ROSA side 17b are integrally built. The TOSA side 17a further provides a pedestal portion 17c to support the sleeve portion of the TOSA 15. This pedestal portion 17c has the concave surface 17f coming in contact with the extending cylinder 15b by two lines. The concave surface 17f extends in parallel to the optical axis of the TOSA 15, namely, the axis of the sleeve portion.

Although the holder 17 shown in FIG. 4A provides the pedestal portion 17c only in the TOSA side 17a, the ROSA side 17b may also provide a portion similar to the pedestal portion 17c to support the ROSA 16. In the front of the pedestal portion 17c is formed with a flange mount 17d that receives the flange 15j of the sleeve 15c when the TOSA 15 is set on the holder 17. The holder 17 further integrally builds, in the front of the flange mount 17d, a pair of latch fingers 17e. These latch fingers 17e engage with the optical connector inserted into the receptacle 21. The ROSA side 17b also provides a pair of latch fingers 17e that may also engage with the optical connector. The holder 17 is set on the lower frame 12 as illustrated in FIG. 2B, as illustrated in FIG. 4B, the bottom 17g of the pedestal portion 17c substantially levels off the bottom 17h of the flange mount 17d, which expands the contact area of the holder 17 with the lower frame 12 to be stable set thereon.

Figure 5A:
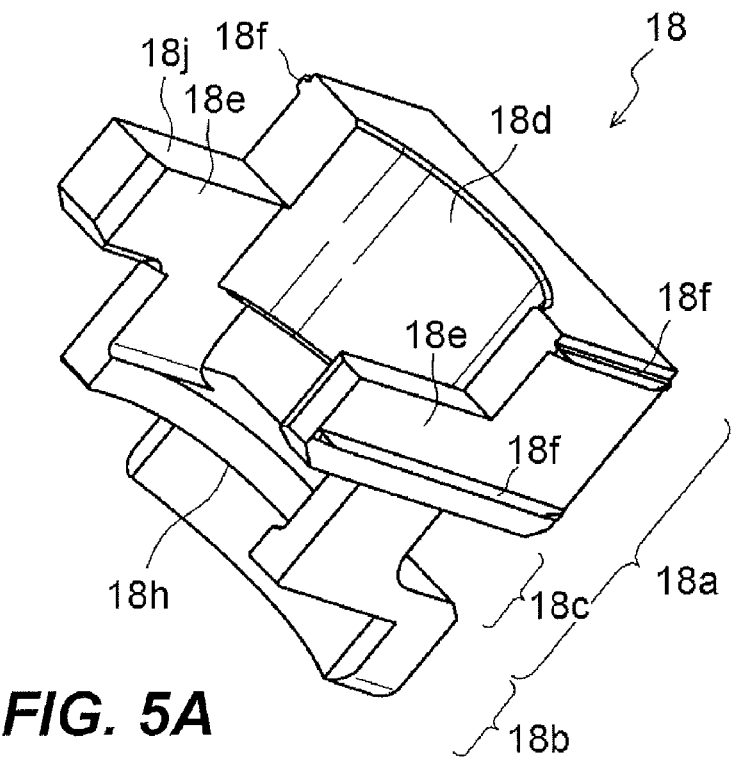
FIGS. 5A and 5B are perspective drawings of the TOSA cover viewed from the lower and the upper, respectively.
Figure 5B:
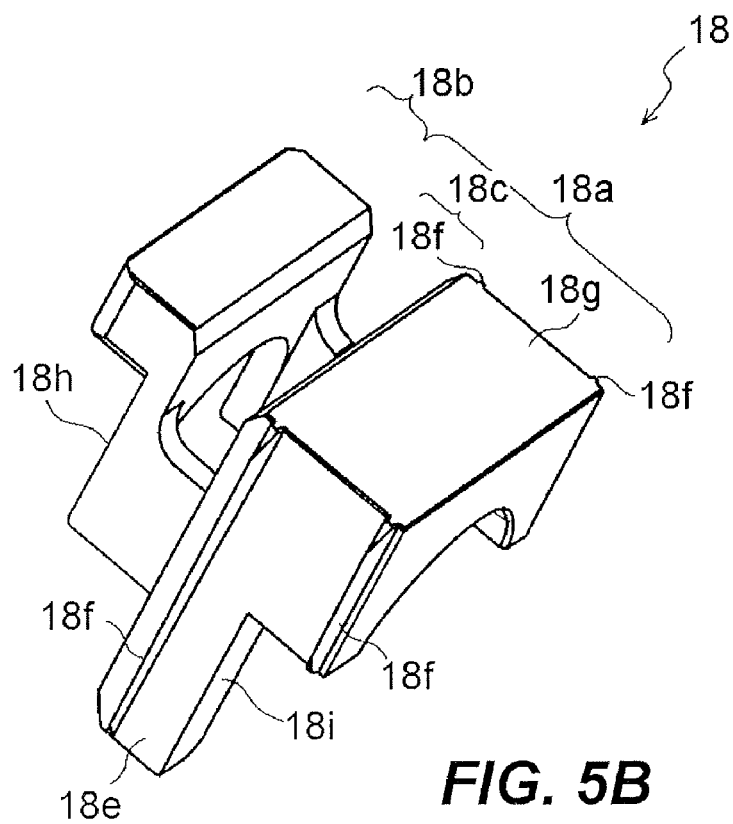

FIG. 5A is a perspective drawing of the TOSA cover 18 viewed from the upper, while, FIG. 5B is a drawing viewed from the lower. The TOSA cover 18, also made of resin, provides a first portion 18a to come in contact with and to press the extending cylinder 15b of the TOSA 15. This first portion 18a has a concave surface 18d, which comes in contact with the extending cylinder 18b by two lines along the optical axis of the TOSA 15. The TOSA cover 18 further provides a second portion 18b in the front of the first portion 18a. The second portion 18b receives the flange 15j when the TOSA cover 18 is assembled with the lower frame 12.

Figure 7A:
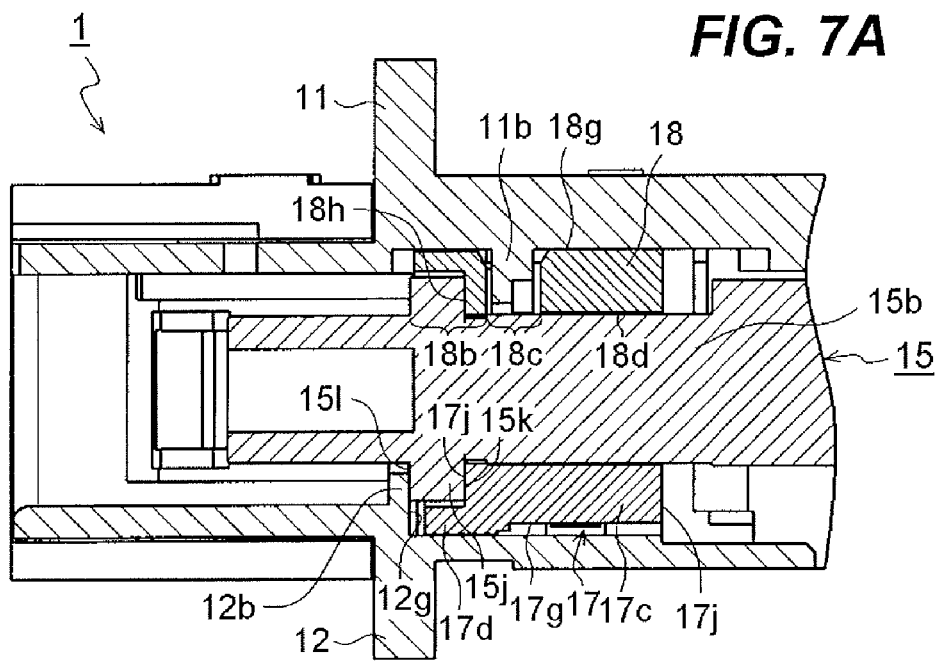
FIG. 7A is a vertical cross section taken along the line B-B shown in FIG. 1B.

The first portion 18a forms a pair of legs 18e extending downward in both sides of the first portion 18a. Setting the leg 18e in a preset position in the lower frame 12, the TOSA cover 18 may be prevented its position from deviating along the optical axis. Moreover, the outer surface of the first portion 18a forms a rib 18f with a triangular section. Functions and effects of this rib will be described later. The gap 18c formed in the front end of the first portion 18a receives the projection 11b formed inside of the upper frame 11, which is illustrated in FIG. 7A. Not only the first portion 18a but the second portion 18b provides a flat top surface 18g to come in contact with the upper frame 11 securely.

Next, the lower frame 12 will be described. FIG. 6A is a perspective drawing of the lower frame 12 viewed from the front, while, FIG. 6B is a drawing of the lower frame viewed from the rear. The lower frame 12 provides a TOSA space 12e, a ROSA space 12f and a plurality of partitions dividing these two spaces. The partitions include side and center posts 12c in the rear of the space, while, a saddle 12b in the front of the space. As described later, the flange 15c of the TOSA 15 or the ROSA 16 in the front surface 15l thereof comes in contact with the rear surface 12g of the saddle 12b. Moreover, the post 12c in the rear of the TOSA space 12e forms a step 12a, where the holder 17 and the TOSA cover 18 abut against. That is, the holder 17 and the TOSA cover 18 are set between the step 12a and the saddle 12b.

Figure 7B:
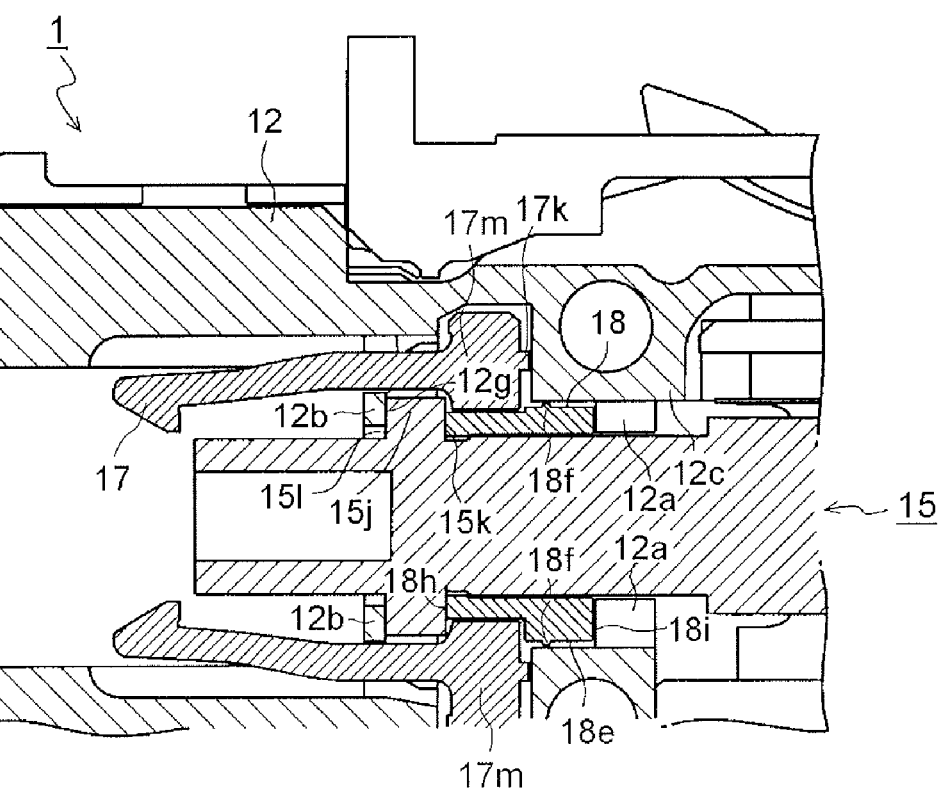
FIG. 7B is a horizontal cross section taken along the line C-C shown in FIG. 1C.
Figure 8A:
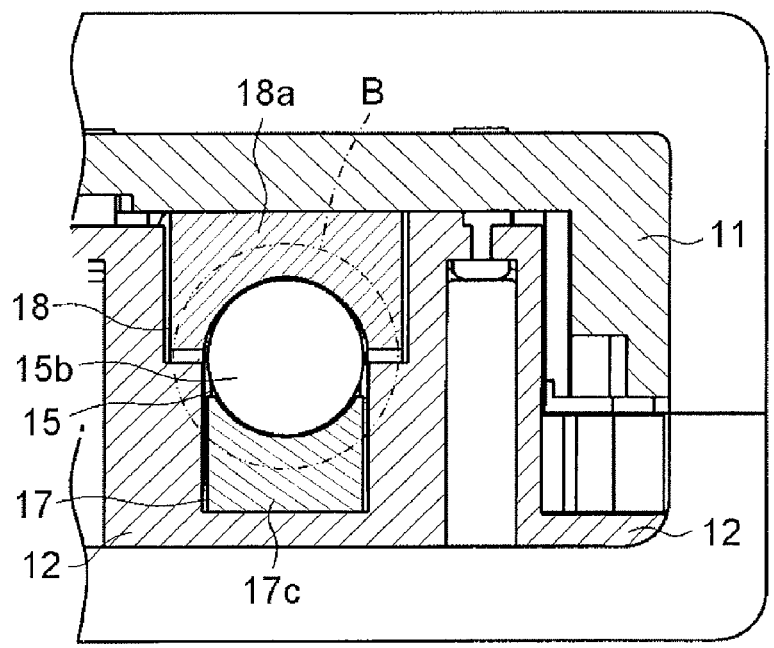
FIG. 8A is a vertical cross section taken along the line A-A shown in FIG. 1B and viewed from the rear, and FIG. 8B magnifies a portion B indicated in FIG. 8A.

The assembly of the TOSA 15, the holder 17, the TOSA cover 18 and the lower frame 12 will be described. FIG. 7A is a vertical cross section taken along the line B-B shown in FIG. 1B, while, FIG. 7B is a horizontal cross section along the line C-C shown in FIG. 1C. FIG. 8A is a vertical cross section along the ling A-A in FIG. 1B, and FIG. 8B magnifies a portion B shown in FIG. 8A.

As shown in FIG. 7A, setting the TOSA 15 in the TOSA space 12e of the lower frame 12, and attaching the holder 17 and the TOSA cover 18, the front surface 15l of the flange 15j abuts against the rear surface 12g of the saddle 12b. While, the rear surface 15j of the flange 15k abuts against the step 17i formed in the flange mount 17d of the pedestal portion 17c. Moreover, as shown in FIG. 7B, between the rear surface 12g of the saddle 12b and the front surface 12d of the post 12c is put with the flange 15j and the base wall 17m of the holder 17, and the rib 17k extends rearward from the base wall 17m such that the tip of the rib 12k abuts against the front surface 12d of the post 12c. Here, the sum of the thickness of the base wall 17m of the holder 17 including a height of the rib 17k and the thickness of the flange 15j is set, before setting the holder in the lower frame 12, so as to be slightly greater than a gap between the rear surface 12g of the saddle 12b and the front surface 12d of the post 12c. Then, setting the holder 12 on the lower frame 12 and placing the TOSA 15 in the TOSA space 12e as putting the flange 15j in the pocket between the saddle 12b and the post 12c, three members, the TOSA 15, the holder 17 and the lower frame 12 may be automatically aligned.

Specifically, setting the holder 17 on the lower frame 12, the saddle 12b and the pedestal portion 17c of the holder 17 forms a pocket therebetween, and by putting the flange 15j in the pocket, a thickness of the flange 15j is greater than a gap of this pocket, the position of the TOSA 15 and the holder 17 on the lower frame 12 may automatically defined.

Subsequently, the TOSA cover 18 is set on thus assembled TOSA 15 with the holder 17. After the TOSA 15 is assembled with the holder 17, a gap may be formed between the flange 15j and the step 12a in the side surface of the rear post 12c. The TOSA cover 18 in the leg portion 18e may be put in this gap such that the rear surface 18i of the leg portion 18e comes in contact with the front surface of the step 12a, while, the step 18h in the second portion 18b of the TOSA cover 18 comes in contact with the rear surface 15k of the flange 15j. Setting the sum of the width of the leg portion 18e and the thickness of the flange 15j be substantially equal to the width of the gap between the rear surface 12g of the saddle portion 12b and the front surface 12a of the post 12c, the TOSA cover 18 may be assembled with the TOSA 15 and the lower frame 12 without rickety.

Moreover, the TOSA cover 18 provides a rib 18f in the sides of the leg portion 18e thereof. These ribs 18f come in contact with the side of the posts 12c, which may also tightly set the TOSA cover 18 in the lower frame 12. In an alternative, the TOSA cover 18 provides another rib in the rear surface 18i of the leg portion 18e that abuts against the step 12a of the post 12c. Thus, the ribs 17k in the rear surface of the base wall 17m of the holder 17, the ribs 18f in the sides and the rear surface of the leg portion 18e of the TOSA cover 18 may set the holder 17 and the TOSA cover 18 in their preset position without rickety by crushing the tip portion of the ribs, 17k and 18f, when these members, the holder 17 and the TOSA cover 18, are assembled with the lower frame 12.

The TOSA 15 is positioned with respect to the lower frame 12 in three directions, X, Y and Z, by the holder 17 and the TOSA cover 18. The direction along the optical axis, the Z-direction in parallel to the longitudinal direction of the transceiver 1, may be determined by, as explained above, crushing the tip portion of the ribs. For the up and down direction, the Y-direction, to put the extending cylinder 15b of the TOSA between the first portion 18a of the TOSA cover 18 and the pedestal portion 17c of the holder 17 may determine the position of the TOSA 15. Moreover, for the left and right direction, the X-direction, to set the flange 15j of the TOSA in the pocket formed between the saddle 12b of the lower frame 12 and the holder 17 may determine the position of the TOSA 15.

Figure 8B:
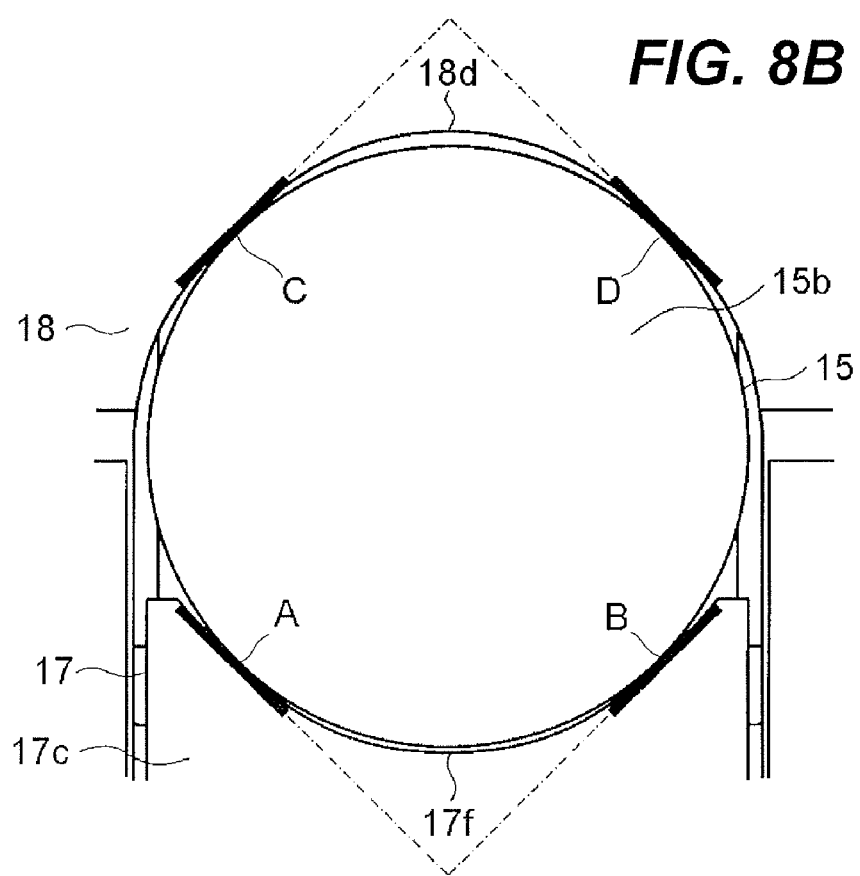

As illustrated in FIG. 8A, the extending cylinder 15b may be mounted on by the pedestal portion 17c of the holder 17, while, it is pressed by the first portion 18a of the TOSA cover 18. Under this condition, as magnified in FIG. 8B, the concave surface 17f of the pedestal portion 17c comes in contact with the extending cylinder 15b by two lines, A and B, while, the concave surface 18d of the TOSA cover 18 also comes in contact with the extending cylinder 15b by two lines, C and D. Because these lines extend normal to the drawings, FIG. 8B illustrates their intersections. That is, the extending cylinder 15b is sandwiched by members with a virtual V-groove in the upside and the down side, which may effectively protect the TOSA 15 from misaligning in perpendicular to the optical axis thereof.

Thus, the optical transceiver 1 according to the present embodiment sets the TOSA 15 between the holder 17 and the TOSA cover 18. Moreover, this setting is performed by the plurality of contact between surfaces, where they virtually form a V-shaped groove, and the cylindrical surface of the TOSA 15. This arrangement may suppress the misalignment of the optical axis with respect to the optical receptacle. Although the embodiment described above concentrates on the TOSA with the box shaped body, the arrangement of the TOSA according to the present invention may easily apply to a TOSA with a conventional co-axial package.

Modified Embodiment

Figure 9:
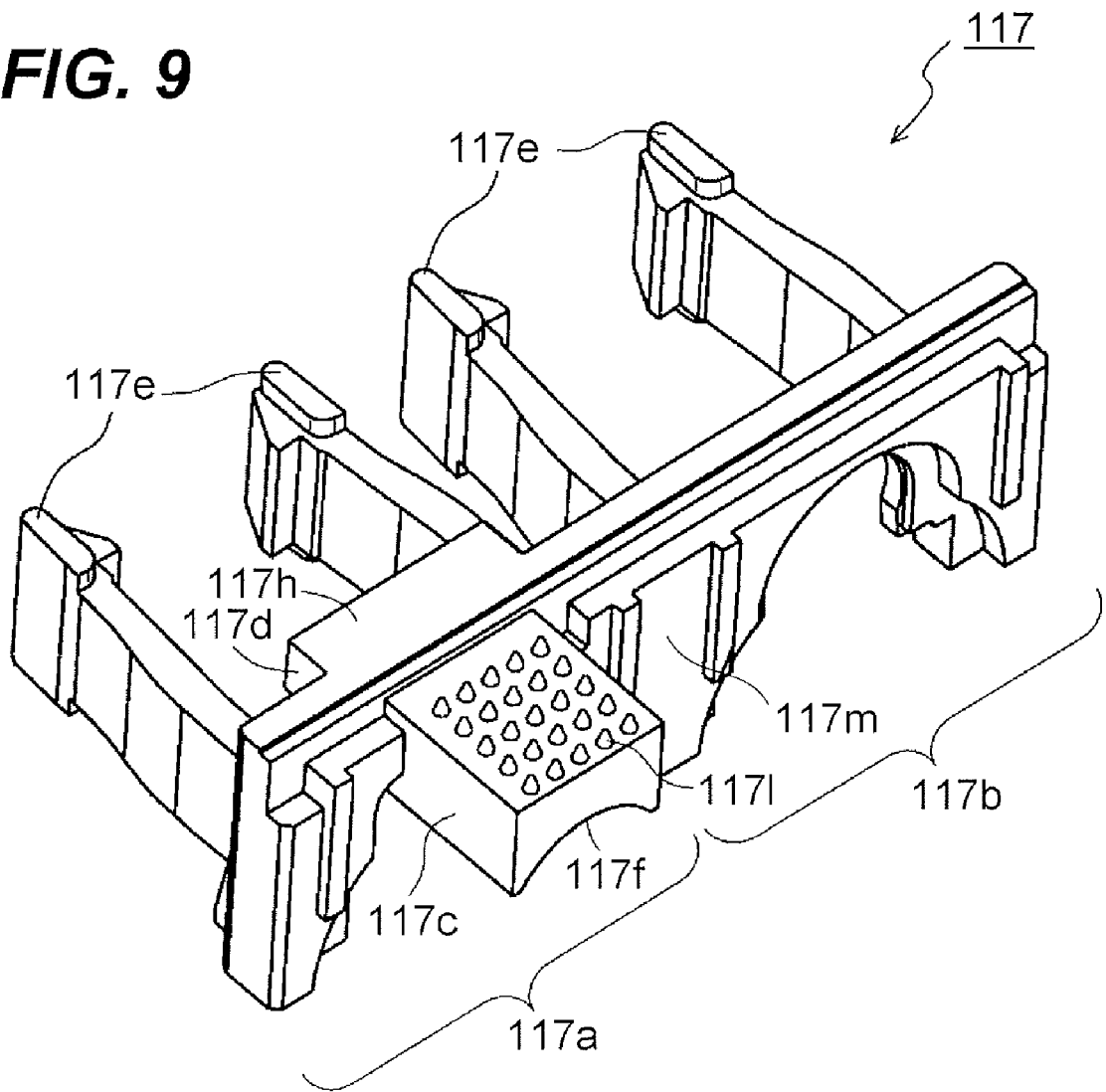
FIG. 9 illustrates a modified holder according to the second embodiment of the invention.

FIG. 9 illustrates a modified holder 117 according to another embodiment of the invention. This holder 117, similar to the previous holder 17 shown in FIG. 5, integrally builds a TOSA side 117a, a ROSA side 117b and a plurality of latch fingers 117e. The TOSA side 117a provides a pedestal portion 117c with a concave surface 117f that comes in contact with the extending cylinder 15b of the TOSA by two lines, and the flange mount 117d in a forward side of the pedestal portion 117e. A feature of this holder 117 distinguishable from the previous holder 17 is that the pedestal portion 117c forms a plurality of projections 117l in the bottom thereof.

Figure 10A:
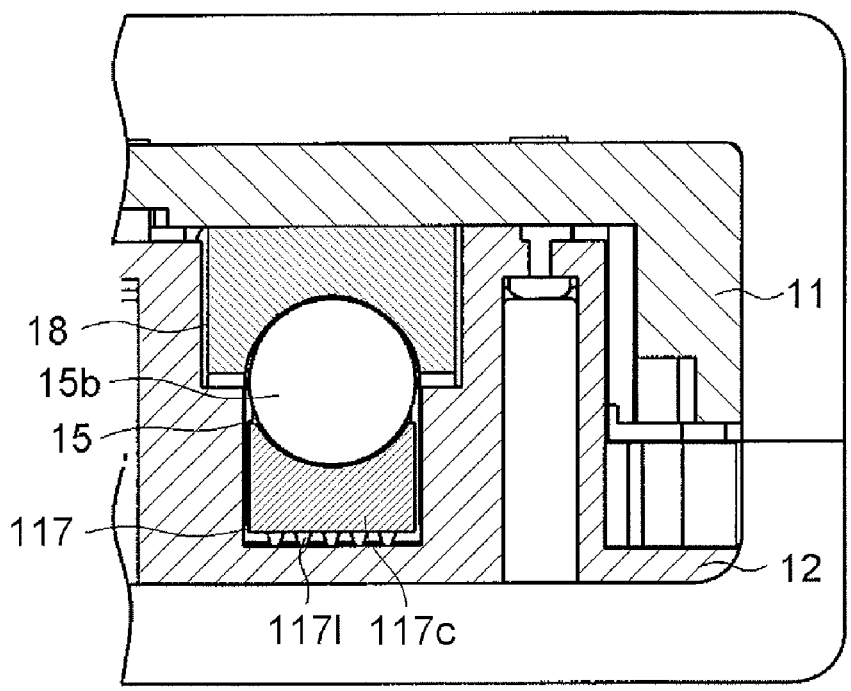
FIG. 10A is a vertical cross section that provides the modified holder, which is taken along the line A-A shown in FIG. 1B and viewed from the rear.
Figure 10B:
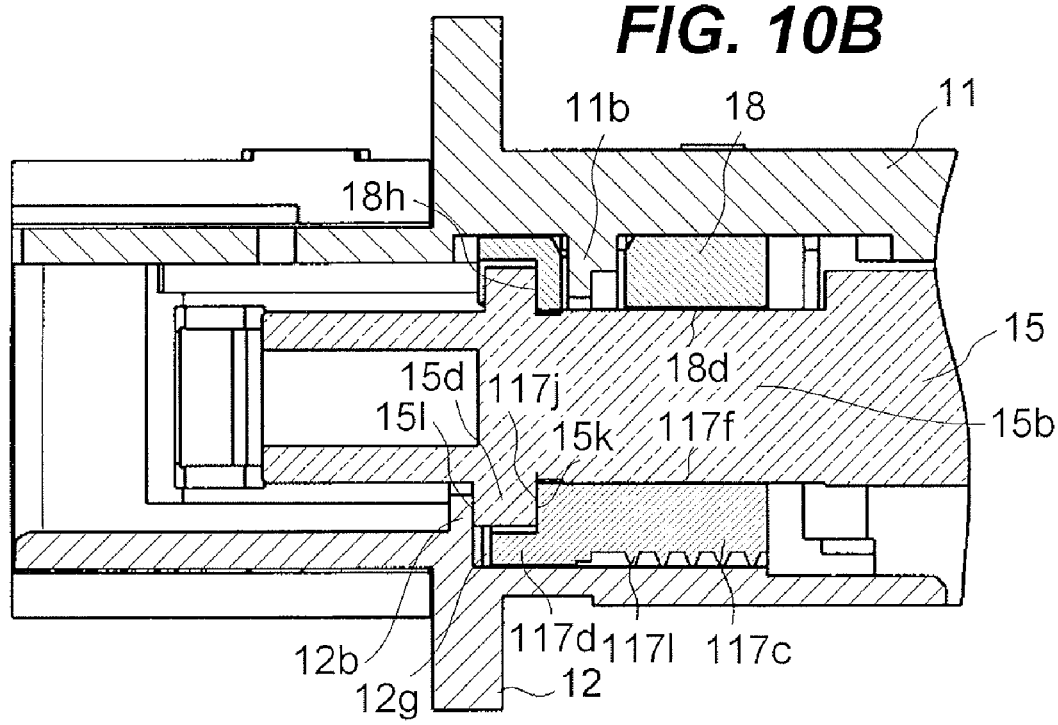
FIG. 10B is a vertical cross section taken along the line B-B shown in FIG. 1B.

FIG. 10A is a cross section taken along the ling A-A shown in FIG. 1B, while FIG. 10B is a cross section taken along the line C-C in FIG. 1C, each illustrating the modified holder 117. As shown in FIG. 10A, the holder 117 supports the extending cylinder 15b of the TOSA 16, while, the TOSA cover 18 presses the extending cylinder 15b so as to sandwich the cylinder 15b. In order to secure the extending cylinder 15b by the holder 117 and the TOSA cover 18 firmly, the upper and the lower frames, 11 and 12, are assembled with screws. Stress due to the screw assembling influences the holder 117, the TOSA 15 and the TOSA cover 18. The projections 117l in the bottom of the pedestal portion 117e may relax this stress by crushing the tip portion of the projections 117l.

Thus, the present optical transceiver may suppress the misalignment of the optical subassembly, when the subassembly is assembled with the frame, compared with a conventional arrangement where the subassembly is supported only by the flange. That is, the conventional arrangement supports the assembly only by a width of the flange along the direction in parallel to the optical axis. The sub-assembly of the present invention is supported in the extending potion thereof by the holder and the cover so as to be put between these components, which automatically align the sub-assembly in the plane perpendicular to the optical axis.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. An optical transceiver that receives an optical connector, comprising:
    an optical subassembly including a body portion that installs a semiconductor optical device and a sleeve portion that extends from said body portion and provides a flange;
    a holder and a subassembly cover, each providing a concave surface that comes in contact with said sleeve portion of said optical subassembly by two points; and
    an upper frame and a lower frame, said upper frame supporting one of said holder and said subassembly cover, said lower frame providing a saddle and a post and supporting the other of said holder and said subassembly cover, said upper and lower frames forming an optical receptacle mating with said optical connector,
    wherein said holder and said flange of said sleeve portion are secured between said saddle and said post such that said flange is put between said holder and said saddle; and said holder is put between said flange and said post, and
    wherein said sleeve portion of said subassembly is aligned with respect to said upper and lower frames through said holder and said subassembly cover.

2. The optical transceiver according to claim 1,
    wherein said holder comprises a base wall and a plurality of latch fingers that latch said optical connector, said flange having a front surface that comes in contact with said saddle and a rear surface that comes in contact with a front surface of said base wall of said holder, and said post providing a front surface that comes in contact with a rear surface of said holder,
    wherein said rear surface of said holder provides a rib whose tip portion crushes and abuts against said front surface of said post.

3. The optical transceiver according to claim 2,
    wherein said lower frame has a first gap between a rear surface of said saddle and said front surface of said post, said first gap being substantially equal to a sum of a thickness of said flange, a thickness of said base wall of said holder and a height of said rib.

4. The optical transceiver according to claim 1,
    wherein said post of said lower frame provides a step, secured said subassembly cover being put between said flange and said step.

5. The optical transceiver according to claim 4,
    wherein said subassembly cover provides a rib that comes in contact with said step,
    wherein said rib crushes in a top portion thereof.

6. The optical transceiver according to claim 5,
    wherein said lower frame has a second gap between a rear surface of said saddle and said step, said second gap being substantially equal to a sum of a thickness of said flange, a thickness of said subassembly cover and a height of said rib.

7. The optical transceiver according to claim 4,
    wherein said lower frame further provides another post and said subassembly cover provides a rib in respective side surfaces thereof that comes in contact with said first post and said second post, and
    wherein said ribs crush in a top portion thereof.

8. An optical transceiver that receives an optical connector, comprising:
- an optical subassembly including a body portion that installs a semiconductor optical device and a sleeve portion that extends from said body portion and provides a flange;
- a holder and a subassembly cover, each providing a concave surface that comes in contact with said sleeve portion of said optical subassembly by two points; and
- an upper frame and a lower frame, said upper frame supporting one of said holder and said subassembly cover, said lower frame supporting the other of said holder and said subassembly cover, said upper and lower frames forming an optical receptacle mating with said optical connector,
- wherein said subassembly cover provides a first portion, a second portion and a gap formed between said first and second portions, said first portion providing said concave surface, said second portion mounting said flange of said sleeve portion, said gap mating with a portion of said upper frame,
- wherein said sleeve portion of said subassembly is aligned with respect to said upper and lower frames though said holder and said subassembly cover.

9. An optical transceiver that receives an optical connector, comprising:
- an optical subassembly including a body portion that installs a semiconductor optical device and a sleeve portion that extends from said body portion;
- a holder and a subassembly cover, each providing a concave surface that comes in contact with said sleeve portion of said optical subassembly by two points; and
- an upper frame and a lower frame, said upper frame supporting one of said holder and said subassembly cover, said lower frame supporting the other of said holder and said subassembly cover, said upper and lower frames forming an optical receptacle mating with said optical connector,
- wherein said sleeve portion of said subassembly is aligned with respect to said upper and lower frames though said holder and said subassembly cover, and
- wherein said holder provides a pedestal portion with said concave surface of said holder and said sleeve portion provides a flange, said pedestal portion providing a flange mount that receives said flange.

10. The optical transceiver according to claim 9,
- wherein said pedestal portion provides a bottom surface that includes a plurality of projections each having a tip portion,
- wherein said tip portion of said projection comes in contact with said lower frame and crushes.

* * * * *